United States Patent
Song

(10) Patent No.: US 12,456,506 B2
(45) Date of Patent: Oct. 28, 2025

(54) MEMORY CONTROLLER, MEMORY SYSTEM AND OPERATION OF ROW-HAMMER TRACKING

(71) Applicant: SK hynix Inc., Gyeonggi-do (KR)

(72) Inventor: Young Ook Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 218 days.

(21) Appl. No.: 18/453,323

(22) Filed: Aug. 22, 2023

(65) Prior Publication Data
US 2024/0347097 A1 Oct. 17, 2024

(30) Foreign Application Priority Data
Apr. 11, 2023 (KR) ........................ 10-2023-0047253

(51) Int. Cl.
*G11C 11/40* (2006.01)
*G11C 11/406* (2006.01)
*G11C 11/4078* (2006.01)

(52) U.S. Cl.
CPC .. *G11C 11/40618* (2013.01); *G11C 11/40615* (2013.01); *G11C 11/4078* (2013.01)

(58) Field of Classification Search
CPC ........ G11C 11/40618; G11C 11/40615; G11C 11/4078
See application file for complete search history.

(56) References Cited

U.S. PATENT DOCUMENTS

| | | | |
|---|---|---|---|
| 7,379,323 B2 | 5/2008 | Miyamoto et al. | |
| 11,961,550 B2 * | 4/2024 | Kim | G11C 11/40615 |
| 11,967,352 B2 * | 4/2024 | You | G11C 11/40622 |

FOREIGN PATENT DOCUMENTS

KR   10-2022-0082704 A   6/2022

\* cited by examiner

*Primary Examiner* — Vanthu T Nguyen
(74) *Attorney, Agent, or Firm* — IP & T GROUP LLP

(57) ABSTRACT

A memory system includes a memory device including banks each including a plurality of rows, and configured to select, within a selected bank of the banks, at least one row from the plurality of rows based on a target address; and a row-hammer tracking module configured to: select the selected bank based on a pattern of accesses to each of the banks, and select the target address according to an access number for each of a plurality of groups of the rows within the selected bank.

19 Claims, 10 Drawing Sheets

| CASE | ACCESS PATTERN | ROW-HAMMER ERROR? |
|---|---|---|
| 1 | (ACT-RD-PCG)^N | YES |
| 2 | (ACT-WT-PCG)^N | YES |
| 3 | ACT-(RD^N)-PCG | NO |
| 4 | ACT-(WT^N)-PCG | NO |

MEMORY CONTROLLER, MEMORY SYSTEM AND OPERATION OF ROW-HAMMER TRACKING

CROSS-REFERENCE TO RELATED APPLICATION

The present application claims the benefit of Korean Patent Application No. 10-2023-0047253, filed on Apr. 11, 2023, which is incorporated herein by reference in its entirety.

BACKGROUND

1. Field

Various embodiments of the present invention relate to a semiconductor design technology, and more particularly, to a memory system including a memory controller performing row-hammer tracking.

2. Description of the Related Art

Recently, the paradigm of the computer environment is shifting to ubiquitous computing, which allows computer systems to be used anytime, anywhere. As a result, the use of portable electronic devices such as mobile phones, digital cameras, and notebook computers is rapidly increasing. Such a portable electronic device generally uses a memory system using one or more memory devices for storing data, that is, a data storage device. The data storage device is used as a main storage device or an auxiliary storage device of a portable electronic device. The data storage device using the memory device has excellent stability and durability because it does not have a mechanical drive, and also has the advantage of very fast access to information and low power consumption.

When a memory cell is continuously accessed, memory cells adjacent to the corresponding memory cell may be consistently affected by an electromagnetic field. In this case, data stored in the memory cells may be distorted. Such a phenomenon is referred to as row hammering. In order to prevent row hammering, a memory device or memory controller detects rows in a memory device accessed more than a predetermined number of times and performs a refresh operation or an error check operation on the detected rows.

SUMMARY

Embodiments of the present invention are directed to a memory system including a memory controller capable of analyzing a tendency of read commands, write commands, and active commands to select a bank vulnerable to a row-hammer attack, and tracking rows vulnerable to the row-hammer attack according to the number of rows of the selected bank and an average value of accessed row addresses of the selected bank.

According to an embodiment of the present invention, a memory system includes a memory device including banks each including a plurality of rows, and configured to select, within a selected bank of the banks, at least one row from the plurality of rows based on a target address; and a row-hammer tracking module configured to: select the selected bank based on a pattern of accesses to each of the banks, and select the target address according to an access number for each of a plurality of groups of the rows within the selected bank.

According to an embodiment of the present invention, a memory controller includes a pattern analysis circuit configured to select at least one bank among banks based on a pattern of accesses to each of the banks; a row detection circuit configured to generate an average address according to an access number of rows in each of groups of rows within the selected bank and an average value of addresses specifying the respective rows, which have been accessed, for each of the groups; and a row-hammer management circuit configured to generate a target address based on the average address.

According to an embodiment of the present invention, an operating method of a memory system includes selecting at least one bank from banks of a memory device based on a pattern of accesses to each of the banks; generating an average address according to an access number of rows in each of groups of rows within the selected bank and an average value of addresses specifying the respective rows, which have been accessed, for each of the groups; generating a target address based on the average address; and selecting at least one row in the memory device from the rows based on the target address.

Further, according to embodiments of the present invention, the memory system may achieve row hammer mitigation with a minimum area in a way that the memory controller tracks the rows vulnerable to the row-hammer attack without counting the number of accesses for each row.

DETAILED DESCRIPTION

Figure 1:
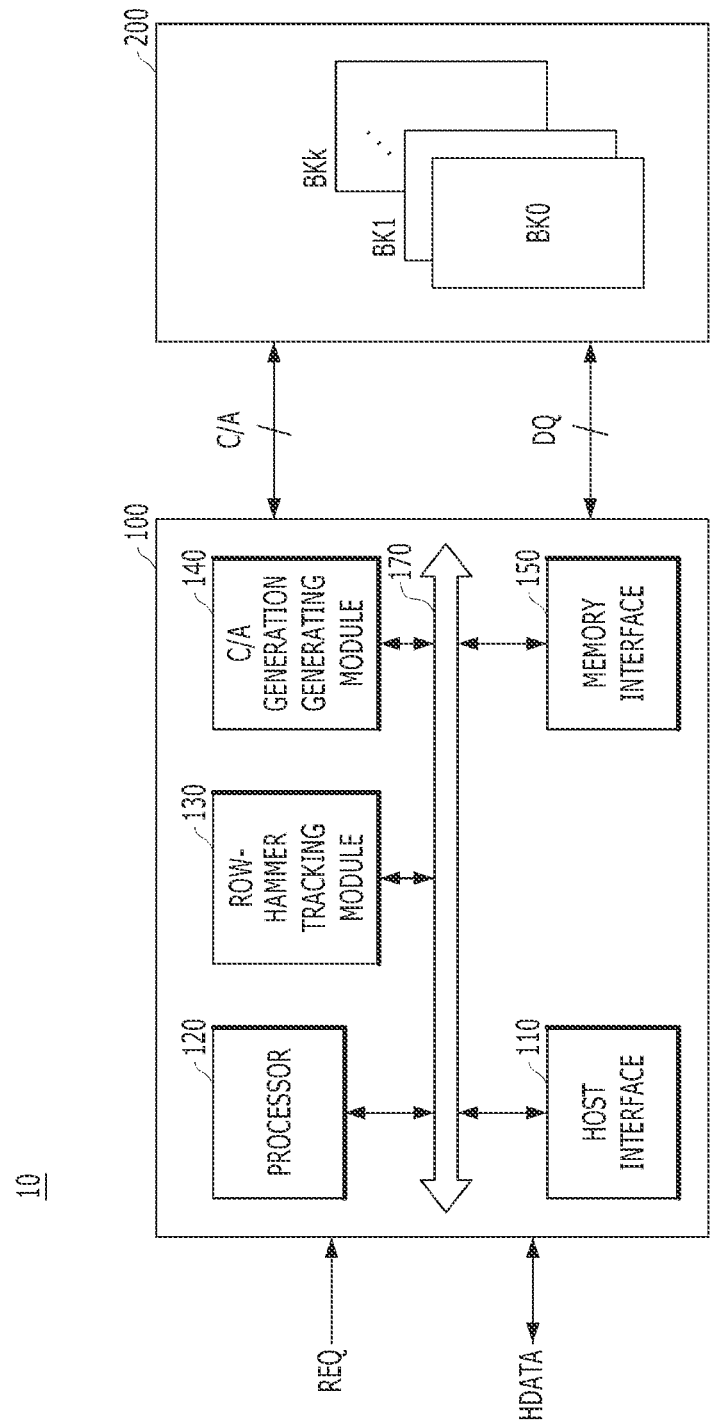
FIG. 1 is a block diagram illustrating a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present invention.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

FIG. 1 is a block diagram illustrating a memory system 10 in accordance with an embodiment of the present invention.

Referring to FIG. 1, the memory system 10 may store data or read the stored data in response to a request provided from a host. The memory system 10 may be used as a main storage device or an auxiliary storage device of the host. The memory system 10 may be used as a device to store data under the control of the host, such as a mobile phone, a smartphone, an MP3 player, a laptop computer, a desktop computer, a game console, TV, a tablet PC, or an in-vehicle infotainment system.

The host may include an independent and substantial processor, which may be referred to as a core. The host may be implemented with a single processor or a multi-core processor including two or more processors. The host may communicate with the memory system 10 using at least one of various communication standards or interfaces such as, for example, Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe of PCI-e), Non-Volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The memory system may include a memory controller 100 and a memory device 200.

The memory controller 100 may control an overall operation of the memory system 10 and control a data exchange between the host and the memory device 200. The memory controller 100 may generate a command/address signal C/A and provide it to the memory device 200 according to the request REQ from the host. Depending on an embodiment, the memory controller 100 may provide a clock to the memory device 200 together with the command/address signal C/A. The memory controller 100 may provide data DQ corresponding to host data HDATA provided from the host to the memory device 200. The memory controller 100 may receive data DQ read from the memory device 200 and provide host data HDATA to the host.

The memory device 200 may perform an active operation, a precharge operation, a refresh operation, a write operation, a read operation, an error check operation, an error correction operation, and an error logging operation, according to the command/address signal C/A and/or the data DQ, which are provided from the memory controller 100. The memory device 200 may be a memory that requires a refresh operation. For example, the memory device 200 may be DRAM, or it may be another type of memory that requires the refresh operation. The refresh operation may include a normal refresh operation in which the memory device 200 sequentially refreshes a plurality of rows, and a target refresh operation in which one or more neighboring rows disposed adjacent to a row having a large number (or frequency) of activations are refreshed.

The memory device 200 may include a plurality of banks BK0 to BKk, where k is an integer greater than 0. In each of the banks BK0 to BKk, a plurality of memory cells coupled to a plurality of word lines (hereinafter, referred to as "rows") and a plurality of bit lines (hereinafter, referred to as "columns") may be arranged in the form of an array. The memory controller 100 may select a predetermined number of memory cells by providing a bank address for selecting a bank of the memory device 200, a row address for specifying rows, and a column address for specifying columns to the memory device 200 as the command/address signal C/A. A detailed configuration of the memory device 200 will be described with reference to FIGS. 8 and 9.

In detail, the memory controller 100 may include a host interface 110, a processor 120, a row-hammer tracking module 130, a command/address (C/A) generation module 140, a memory interface 150, and a bus 170.

The host interface 110 may be configured to communicate with the host connected to the memory system 10 under the control of the processor 120. For example, the host interface 110 may receive the request REQ and the host data HDATA from the host and provide the host data HDATA to the host by receiving the data DQ read from the memory device 200 through the memory interface 150.

The processor 120 may perform various types of computational and/or other operations for controlling the memory device 200, and/or may execute instructions in the form of firmware or other types of software. The processor 120 may receive the request REQ and the host data HDATA provided from the host through the host interface 110. The processor 120 may generate various commands (e.g., an active command, a precharge command, a refresh command, a refresh management command, a read command, a write command, a mode register command, an error check command, and an error information request command) corresponding to the request REQ, and addresses (e.g., a bank address, a row address, and a column address), and transmit the host data HDATA to the memory interface 150. The processor 120 may change the order in which the request REQ is received from the host and the order of the operation to be instructed to the memory device 200 to improve the performance of the memory device 200. For example, the processor 120 may adjust the order so that a write operation is performed before a read operation, even if the host requests the read operation of the memory device 200 first and the write operation later. The processor 120 may control overall operations of the host interface 110, the row-hammer tracking module 130, the C/A generation module 140, and the memory interface 150.

The row-hammer tracking module 130 may collect, based on the commands and addresses, information on rows in the memory device 200. The rows may have been subjected to a row-hammer attack.

In accordance with an embodiment, the row-hammer tracking module 130 may select at least one bank from the banks BK0 to BKk of the memory device 200 based on a tendency of read commands, write commands, and active commands provided to the banks BK0 to BKk. That is, the tendency may be regarded as a pattern of accesses to the banks BK0 to BKk. For example, the row-hammer tracking module 130 may compare, for each bank, a total number of times of issuance of read and write commands (hereinafter, referred to as "a read/write number") with a number of times of issuance of active commands (hereinafter, referred to as "an active number") to select at least one bank having a lesser number than a reference number in a difference between the read/write number and the active number. In an embodiment, the pattern of accesses to a bank may be represented by the difference between the read/write number and the active number of the bank. The row-hammer tracking module 130 may divide rows of the selected bank into a plurality of groups and may select a target address according to a number of accesses to the rows (hereinafter, referred to as "an access number of the rows") included in each group. In an embodiment, the groups may be predetermined within each of the banks. In this case, the row-hammer tracking module 130 may not divide rows of the selected bank.

In particular, the row-hammer tracking module 130 may calculate an average value of row addresses that specify rows, which have been accessed within each group of the selected bank, may detect a certain group, of which the access number is greater than a threshold value, and may generate a target address based on the average value of the certain group. The row-hammer tracking module 130 may transmit the collected information or the target address to the command/address generation module 140. A detailed configuration and operation of the row-hammer tracking module 130 will be described with reference to FIGS. 2 to 7.

The command/address generation module 140 may generate the command/address signal C/A by scheduling the commands and address provided from the processor 120 and the collected information from the row-hammer tracking module 130. The command/address generation module 140 may provide, as the command/address signal C/A, an address (to be activated) together with the active command and may provide, as the command/address signal C/A, the target address together with the refresh management command or the error check command.

The memory device 200 may perform a target refresh operation on adjacent rows of a target row indicated by the target address. That is, the target row may be the one that is determined, through the target address by the row-hammer tracking module 130, to have been attacked the most. For example, if the row-hammer tracking module 130 determines that a 73-th row of the memory device 200 has been attacked the most, the memory device 200 may perform a target refresh operation on 72-th and 74-th rows, which are adjacent to the 73-th rows. Further, the memory device 200 may perform an error check operation on the target row or adjacent rows. For example, the memory device 200 may perform an error check operation on the 73-th row of a first bank according to an error check command. The error check operation, also known as an error check and scrub (ECS) operation, may mean an operation of reading data from a target row or adjacent rows, and checking errors in the read data to select areas with a lot of errors. The error check operation may be performed in an active operation, a read operation, and a precharge operation, but may further include a write operation (an operation of re-writing corrected data in a read operation) according to an embodiment. Accordingly, the error check command may refer to commands including an active command, a read command, a precharge command, and/or a write command.

The memory interface 150 may be configured to communicate with the memory device 200 under the control of the processor 120. For example, the memory interface 150 may transmit the command/address signal C/A and the data DQ to the memory device 200 and transmit the data DQ read from the memory device 200 to the host interface 110.

The processor 120 may transmit data between the host interface 110, the row-hammer tracking module 130, the command/address generation module 140, and the memory interface 150 via the bus 170. According to an embodiment, the host interface 110, the row-hammer tracking module 130, the command/address generation module 140, and the memory interface 150 may communicate with each other independently without passing through the bus 170. For example, the row-hammer tracking module 130 and host interface 110 may communicate directly with each other without passing through the bus 170. The row-hammer tracking module 130 and the memory interface 150 may communicate with each other directly without passing through the bus 170. The host interface 110 and the memory interface 150 may also communicate directly with each other without passing through the bus 170.

As described above, in accordance with an embodiment of the present invention, in the memory system 10, the memory controller 100 may select a bank vulnerable to a row-hammer attack by analyzing the pattern of accesses to each bank, and select a target address according to the access number of rows of the selected bank and an average value of addresses indicating the rows, which have been accessed within the selected bank. The memory device 200 may perform a target refresh operation or an error check operation on rows according to the target address. Accordingly, it is possible to track the row vulnerable to the row-hammer without counting the access number of rows for each group, thereby achieving the row-hammer mitigation with a minimum area.

Hereinafter, a detailed configuration of the memory system 10 in accordance with an embodiment will be described. In the following embodiments, it is described that first to fourth banks BK0 to BK4 are disposed in the memory device 200, as an example.

Figures 2, 3:
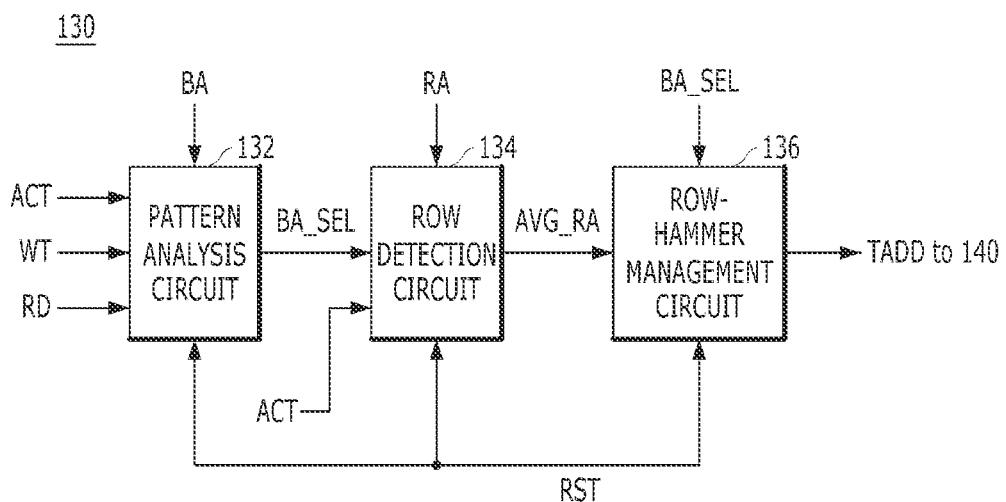
FIG. 2 is a detailed block diagram illustrating a row-hammer tracking module in accordance with an embodiment of the present invention.
FIG. 3 is a table to facilitate understanding FIG. 2.

FIG. 2 is a detailed block diagram illustrating the row-hammer tracking module 130 in accordance with an embodiment of the present invention. FIG. 3 is a table to facilitate understanding FIG. 2.

Referring to FIG. 2, the row-hammer tracking module 130 includes a pattern analysis circuit 132, a row detection circuit 134, and a row-hammer management circuit 136.

The pattern analysis circuit 132 may generate a bank selection signal BA_SEL to select at least one bank among the first to fourth banks BK0 to BK4 by comparing, for each bank, the read/write number of read commands RD and write commands WT with the active number of active commands ACT.

For reference, the row hammering phenomenon refers to a phenomenon in which, when a specific row is accessed (i.e., active) with high frequency, data of memory cells connected to adjacent rows to the specific row are damaged. Therefore, compared to a case where a plurality of read or write operations are performed on memory cells connected to the specific row after the specific row is activated, it can be determined that the row hammering phenomenon is more likely to occur when a read or write operation is performed only once on the memory cells connected to the specific row after the specific row is activated. That is, as described in FIG. 3, patterns of accesses to a bank or access patterns (CASE 1 and 2) in the order of one active command (ACT)→one read or one write command (RD, WT)→one precharge command (PCG) may be more vulnerable than patterns of accesses to a bank or access patterns (CASE 3 and 4) in the order of one active command (ACT)→a plurality of read or write commands (RD, WT)→one precharge command (PCG). Accordingly, in an embodiment of this invention, the pattern analysis circuit 132 may compare, for a bank address BA, the read/write number with the active number and may select a bank having a lesser number than the reference number in the difference between the read/write number and the active number. According to an embodiment, the pattern analysis circuit 132 may select, as a bank vulnerable to a row-hammer attack, a bank having a least number in the difference between the read/write number and the active number. The pattern analysis circuit 132 may be initialized according to an initialization signal RST.

The row detection circuit 134 may divide row of a selected bank that is selected according to the bank selection signal BA_SEL, into a plurality of groups, and calculate an average value of row addresses that specify the rows that have been accessed within each group of the selected bank, according to a row address RA and the active command ACT. The row detection circuit 134 may generate a total access number by accumulating and counting the access number of rows for each group according to the row address RA and the active command ACT. The row detection circuit 134 may generate an average address AVG_RA according to the average value calculated for the certain group when the total access number of the rows included in the certain group exceeds the threshold value. The row detection circuit 134 may be initialized according to the initialization signal RST.

The row-hammer management circuit 136 may generate a target address TADD using the average address AVG_RA and provide the target address TADD to the command/address generation module 140. The row-hammer management circuit 136 may generate the target address TADD by selecting the average address AVG_RA of the bank selected according to the bank selection signal BA_SEL. The row-hammer management circuit 136 may activate the initialization signal RST after the target address TADD is output. The initialization signal RST may be provided to the pattern analysis circuit 132 and the row detection circuit 134.

Figure 4:
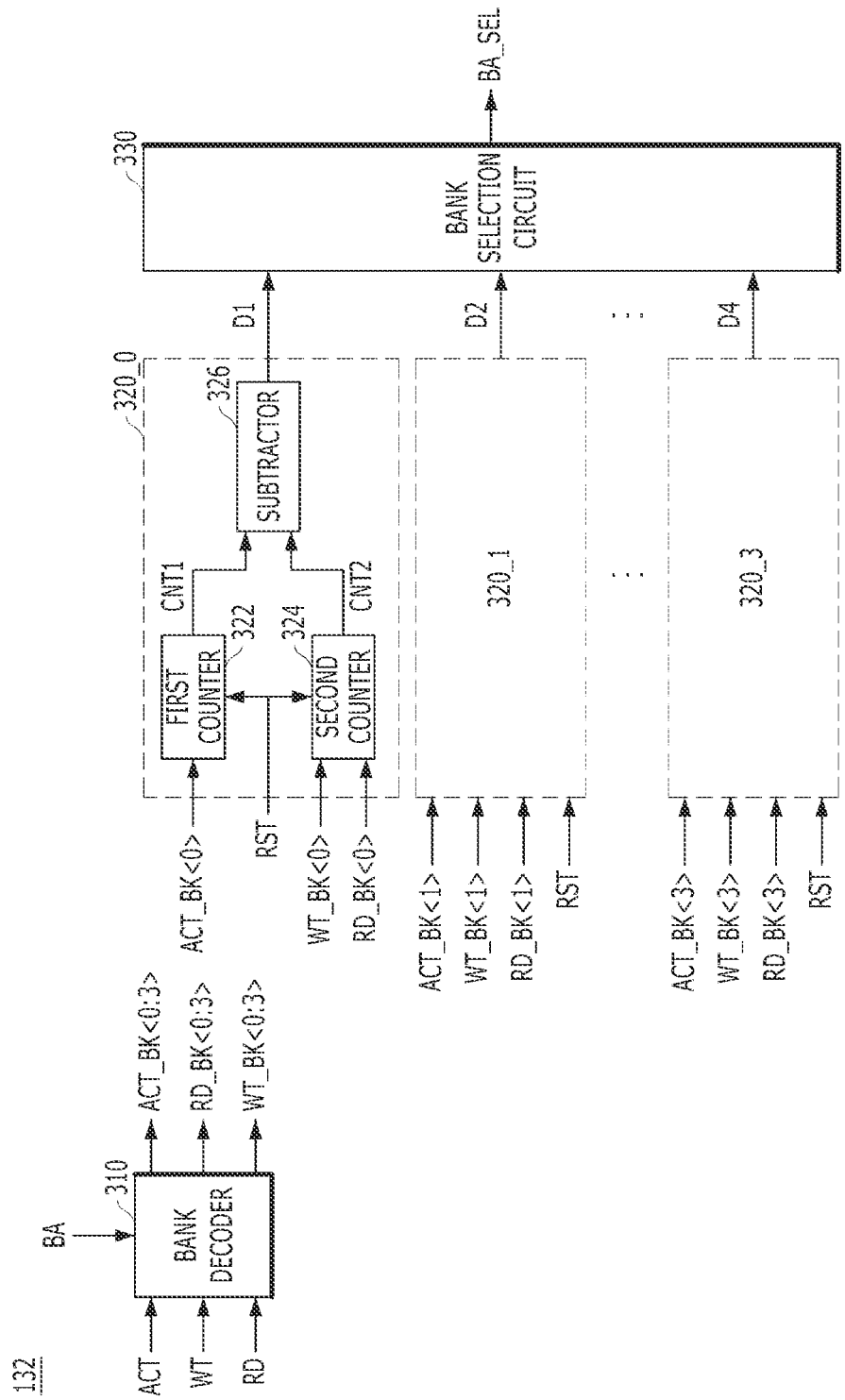
FIG. 4 is a detailed configuration diagram illustrating a pattern analysis circuit of FIG. 2.

FIG. 4 is a detailed configuration diagram illustrating the patten analysis circuit 132 of FIG. 2.

Referring to FIG. 4, the patten analysis circuit 132 may include a bank decoder 310, first to fourth counting comparison circuits 320_1 to 320_4, and a bank selection circuit 330.

The bank decoder 310 may generate first to fourth bank active signals ACT_BK<0:3>, first to fourth bank read signals RD_BK<0:3>, and first to fourth bank write signals WT_BK<0:3>, respectively corresponding to the first to fourth banks BK0 to BK4, by decoding the bank address BA.

The first to fourth counting comparison circuits 320_1 to 320_4 may correspond to the first to fourth banks BK0 to BK4, respectively. The first to fourth counting comparison circuits 320_1 to 320_4 may generate first to fourth difference signals D1 to D4 by respectively calculating a difference between an active number of the bank active signals ACT_BK<0:3> and a read/write number of the bank read signals RD_BK<0:3> and the bank write signals WT_BK<0:3>. The first to fourth counting comparison circuits 320_1 to 320_4 may be initialized according to the initialization signal RST. Since the first to fourth comparison circuits 320_1 to 320_4 have substantially the same configuration, the first counting comparison circuit 320_1 will be described as an example.

The first counting comparison circuit 320_1 may have a first counter 322, a second counter 324, and a subtractor 326. The first counter 322 may generate a first counting value CNT1 by counting the number of inputs (hereinafter, referred to as "an input number") of the first bank active signals ACT_BK<0>. The second counter 324 may generate a second counting value CNT2 by counting an input number of the first bank read signal RD_BK<0> and an input number of the first bank write signal WT_BK<0>. The first counter 322 and the second counter 324 may be initialized according to the initialization signal RST. The subtractor 326 may output a difference between input numbers as the first difference signal D1.

The bank selection circuit 330 may select a signal whose value is less than or equal to the reference number, from the first to fourth difference signals D1 to D4, and output at least one bank address corresponding to the selected signal as the bank selection signal BA_SEL.

With the above configuration, the pattern analysis circuit 132 may select a bank that is vulnerable to the row-hammer attack by comparing the read/write number of read commands RD and write commands WT and the active number of active commands ACT.

Figure 5:
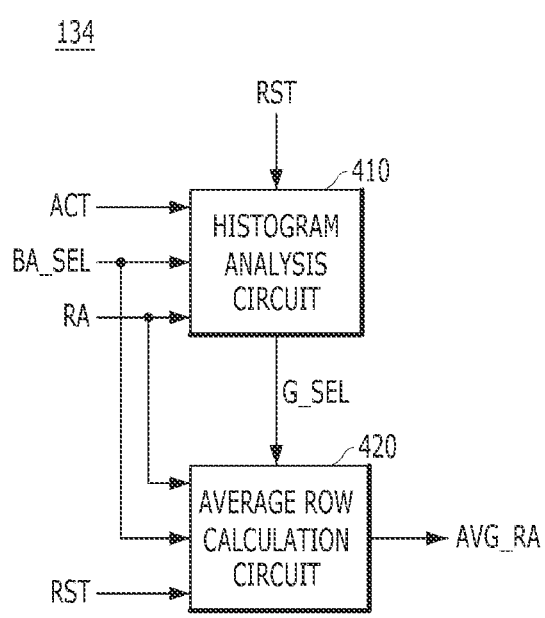
FIG. 5 is a detailed configuration diagram illustrating a row detection circuit of FIG. 2.
Figure 6A:
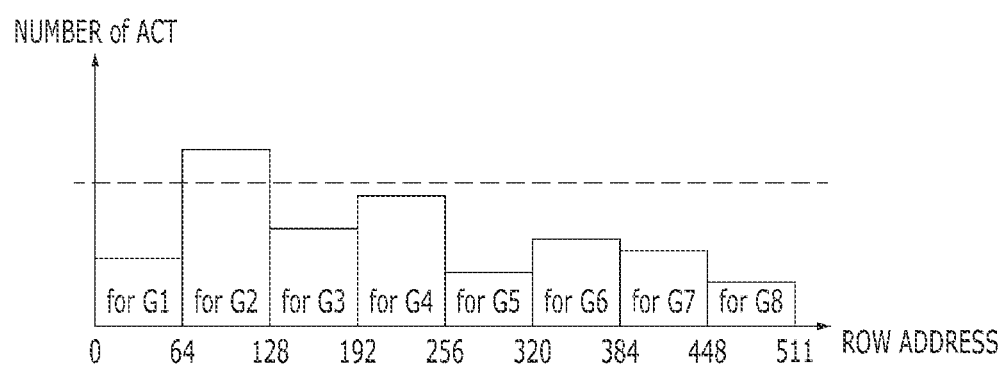
FIGS. 6A and 6B are diagrams for describing operations of a histogram analysis circuit of FIG. 5.
Figure 6B:
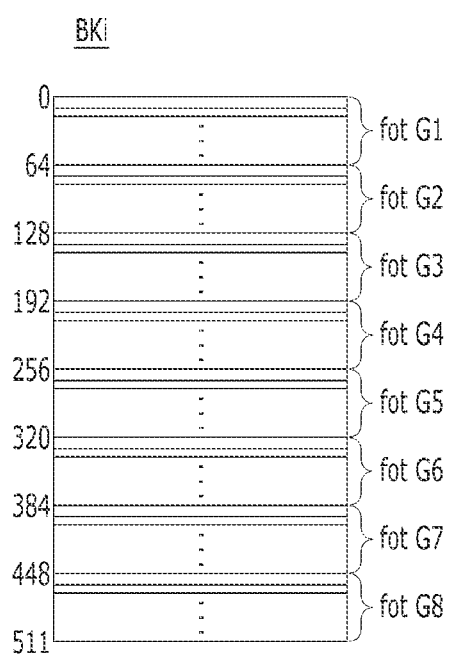

FIG. 5 is a detailed configuration diagram illustrating the row detection circuit 134 of FIG. 2. FIGS. 6A and 6B are diagrams for describing operations of a histogram analysis circuit 410 of FIG. 5.

Referring to FIG. 5, the row detection circuit 134 may include a histogram analysis circuit 410 and an average row calculation circuit 420.

The histogram analysis circuit 410 may generate a histogram by counting the access number of rows for each group of the selected bank according to the bank selection signal BA_SEL, the row address RA and the active command ACT.

As shown in FIG. 6A, the histogram analysis circuit 410 may generate a histogram with a value of the row address RA on an X-axis and the total access number (e.g., the input number of the active commands ACT) on a Y-axis. That is, the histogram may show the total access number accumulated by counting the access number of rows for each group. For each group, the histogram analysis circuit 410 may compare the total access number with a preset threshold value H_TH to generate a group selection signal G_SEL for specifying a group, of which the total access number is greater than the preset threshold value H_TH. The histogram analysis circuit 410 may initialize the histogram according to the initialization signal RST.

As shown in FIG. 6B, each bank BKi may be represented by a plurality of groups G1 to G8, each containing a plurality of rows. For example, if 512 rows are arranged in each bank BKi, the bank BKi may be represented by first to eighth groups G1 to G8 each including 64 rows. The first group G1 may include first to 64th rows (0 to 63), the second group G2 may include 65th to 128th rows (64 to 127), and in this way, the eighth group G8 may include 449th to 512th rows (448 to 511). The histogram of FIG. 6A shows the total access number (e.g., the input number of the active commands ACT) for each of the first to eighth groups G1 to G8.

Referring back to FIG. 5, the average row calculation circuit 420 may calculate the average value of the addresses indicating the rows that have been accessed within each group of the selected bank according to the bank selection signal BA_SEL and the row address RA. The average row calculation circuit 420 may output the calculated average value of a group that is selected by the group selection signal G_SEL, as the average address AVG_RA. The average row calculation circuit 420 may be initialized according to the initialization signal RST.

Figure 7:
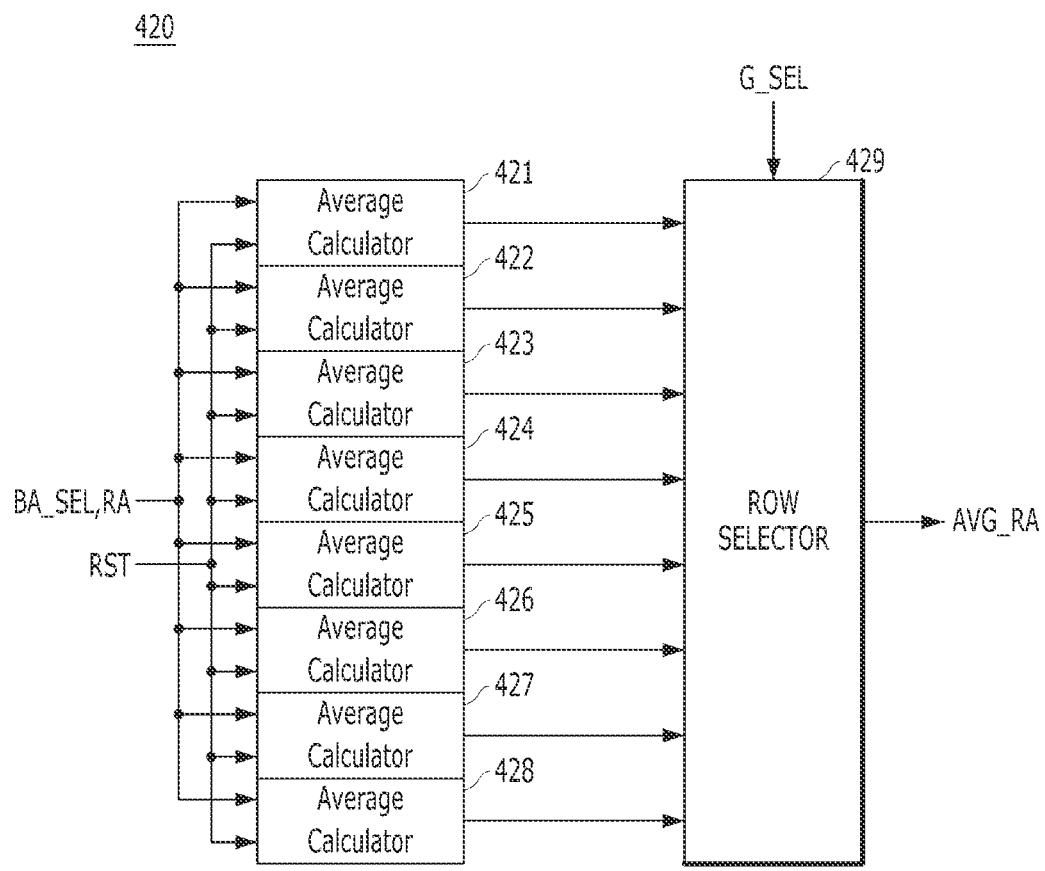
FIG. 7 is a detailed configuration diagram illustrating an average row calculation circuit of FIG. 5.

FIG. 7 is a detailed configuration diagram illustrating the average row calculation circuit 420 of FIG. 5.

Referring to FIG. 7, the average row calculation circuit 420 may include first to eighth average calculators 421 to 428, and a row selector 429.

The first to eighth average calculators 421 to 428 may correspond to the first to eighth groups G1 to G8, respectively. Each of first to eighth average calculators 421 to 428 may calculate an average value of addresses indicating the rows, which have been accessed within a corresponding group, according to the bank selection signal BA_SEL and the row address RA. The first to eighth average calculators 421 to 428 may initialize the average value according to the initialization signal RST. For example, the first average calculator 421 may calculate the average value of 700/224=3.125 for the first group G1 when the first row included in the first group G1 is accessed once, the second row included in the first group G1 is accessed 100 times, the third row included in the first group G1 is accessed 100 times, the fourth row included in the first group G1 is accessed 10 times, the fifth row included in the first group G1 is accessed 10 times, the 15th row included in the first group G1 is accessed once, the 30th row included in the first group G1 is accessed once, and the 64th row included in the first group G1 is accessed once. That is, by calculating the average value of the addresses of the accessed rows, the probability of selecting a target row with a possibility of the row-hammer attack may increase.

The row selector 429 may output the average address AVG_RA by selecting one of the average values calculated by the first to eighth average calculators 421 to 428 according to the group selection signal G_SEL.

Figure 8:
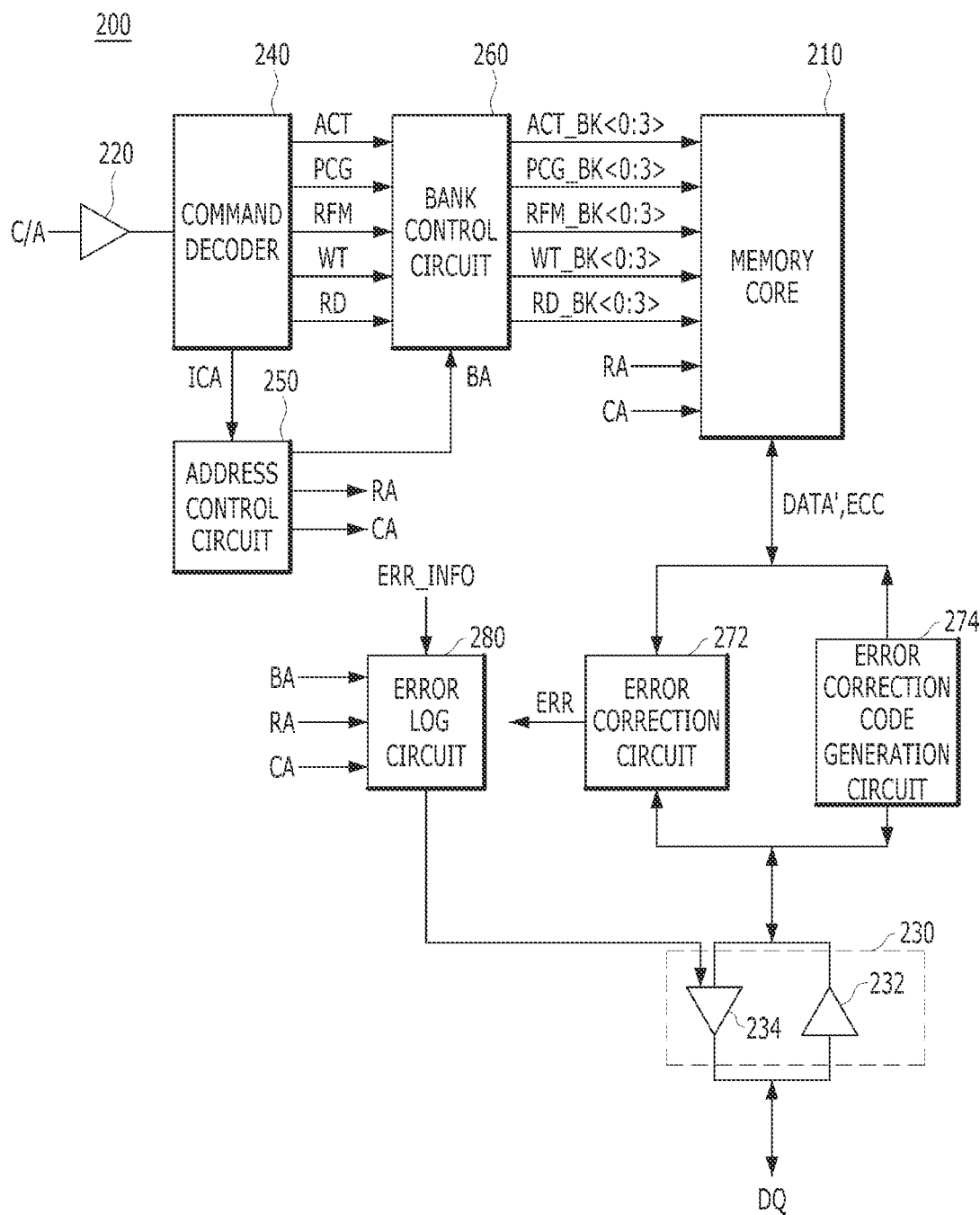
FIG. 8 is a detailed block diagram illustrating a memory device in accordance with an embodiment of the present invention.
Figure 9:
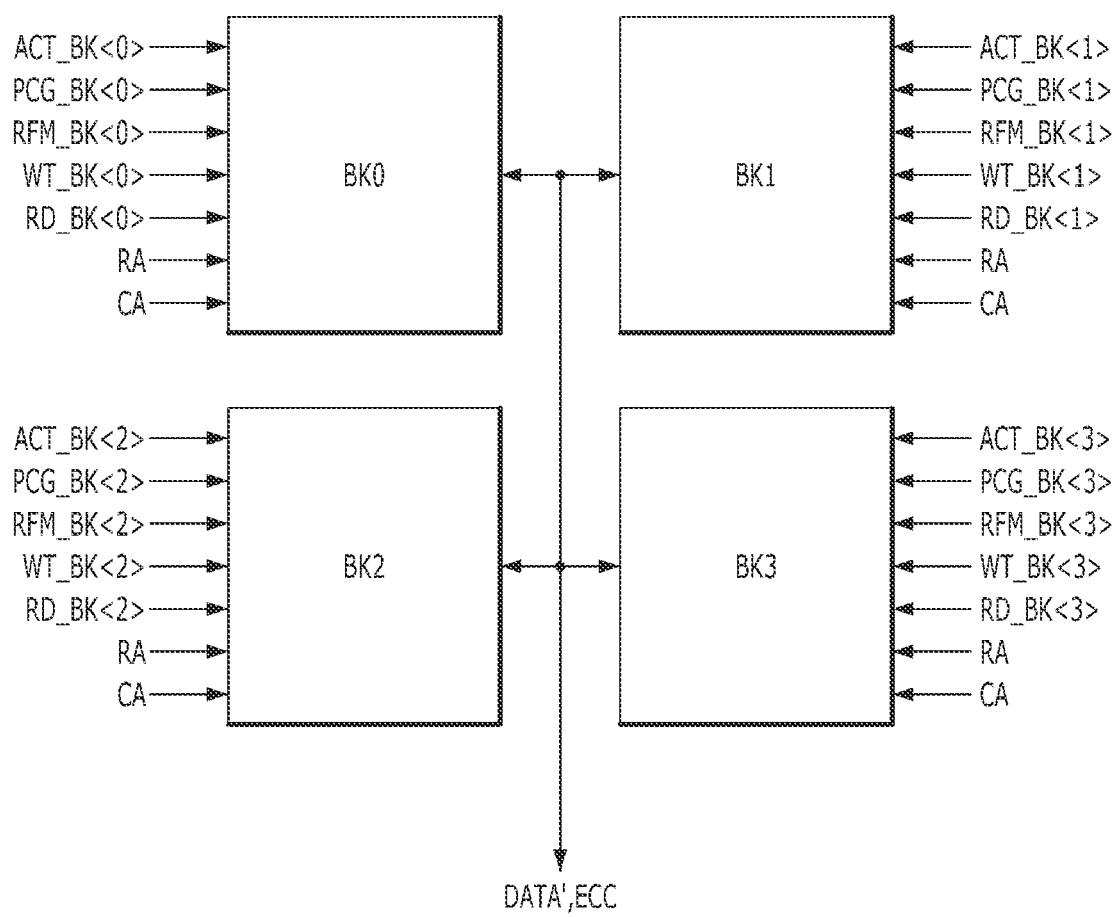
FIG. 9 is a detailed configuration diagram illustrating a memory core of FIG. 8.

FIG. 8 is a detailed block diagram illustrating the memory device 200 in accordance with an embodiment of the present invention. FIG. 9 is a detailed configuration diagram illustrating a memory core 210 of FIG. 8.

Referring to FIG. 8, the memory device 200 may include a memory core 210, a command/address input circuit 220, a data input/output circuit 230, a command decoder 240, an address control circuit 250, a bank control circuit 260, an error correction circuit 272, an error correction code generation circuit 274, and an error log circuit 280.

The command/address input circuit 220 may receive a command/address signal C/A. Depending on a type of the memory device 200, a command/address signal may be input to the same input terminals, or a command and an address may be input to separate input terminals. Herein, it is illustrated that the command/address signal C/A is input to the same terminals. The command/address signal C/may be composed of multi-bits.

The data input/output circuit 230 may receive data DQ or transfer data DQ. The data input/output circuit 230 may include a receiver 232 for receiving the data DQ to be written into the memory core 210 during a write operation, and a transmitter 234 for outputting the data DQ read from the memory core 210 during a read operation.

The command decoder 240 may generate an active command ACT, a precharge command PCG, a refresh management command RFM, a write command WT, a read command RD, and an error information request command ERR_INFO by decoding the command/address signal C/A received by the command/address input circuit 220. The active command ACT may be input when an active operation is commanded, and the precharge command PCG may be input when a precharge operation is commanded. The refresh management command RFM may be input when a target refresh operation is commanded. Also, the write command WT may be input when a write operation is commanded, and the read command RD may be input when a read operation is commanded. Also, the error information request command ERR_INFO may be input when there is a request for error information.

The memory controller 100 may additionally provide a refresh command, and the memory device 200 may perform a normal refresh operation that sequentially refreshes a plurality of rows according to the refresh command provided by the memory controller 100 or the internally generated refresh command. In order to describe the gist of the present invention, a description related thereto will be omitted.

The address control circuit 250 may classify an internal command/address ICA received from the command decoder 240 as a bank address BA, a row address RA, and a column address CA. The bank address BA may be an address for selecting at least one bank among first to fourth banks BK0 to BK3 of the memory core 210. The row address RA may be an address for selecting at least one row among a plurality of rows in the bank. The column address CA may be an address for selecting columns on which a read operation or a write operation is to be performed in the bank. Each of the bank address BA, the row address RA, and the column address CA may be composed of multi-bits.

The bank control circuit 260 may generate first to fourth bank active signals ACT_BK<0:3>, first to fourth bank precharge signals PCG_BK<0:3>, first to fourth bank refresh management signals RFM_BK<0:3>, first to fourth bank read signals RD_BK<0:3>, and first to fourth bank write signals WT_BK<0:3>, respectively corresponding to the first to fourth banks BK0 to BK4, by decoding the bank address BA. The bank control circuit 260 may activate a bank active signal of a bank selected by the bank address BA, among the first to fourth bank active signals ACT_BK<0:3>, according to the active command ACT. The bank control circuit 260 may activate a bank precharge signal of the selected bank, among the first to fourth bank precharge signals PCG_BK<0:3>, according to the precharge command PCG. The bank control circuit 260 may activate a bank refresh management signal of the selected bank, among the first to fourth bank refresh management signals RFM_BK<0:3>, according to the refresh management command RFM. The bank control circuit 260 may activate a bank read signal of the selected bank, among the first to fourth bank read signals RD_BK<0:3>, according to the read command RD. The bank control circuit 260 may activate a bank write signal of the selected bank, among the first to fourth bank write signals WT_BK<0:3>, according to the write command WT.

The error correction circuit 272 may correct an error of data DATA' based on an error correction code ECC, which are read from a bank on which a read operation is performed among the first to fourth banks BK0 to BK3 of the memory core 210. Herein, correcting an error may mean detecting an error in the data DATA' and correcting the detected error in the data DATA'. The error correction circuit 272 may detect and correct an error in the error correction code ECC as well as an error in the data DATA'. When an error in the data DATA' is detected and the detected error is corrected, data input to the error correction circuit 272 and data output from the error correction circuit 272 may be different from each other. An error signal ERR may be a signal which is activated when an error is detected by the error correction circuit 272.

The error correction code generation circuit 274 may generate an error correction code ECC based on data during a write operation. During the write operation, only the error correction code ECC may be generated based on the data DQ, and an error of the data DQ may not be corrected.

Therefore, the data DQ input to the error correction code generating circuit 274 and the data DATA' output from the error correction code generating circuit 274 may be the same.

The error log circuit 280 may log an error which is detected during an error check operation. To be specific, the error log circuit 280 may classify and store a bad area based on the error detected during an error check operation. For example, the error log circuit 280 may count the number of errors for each row of the first to fourth banks BK0 to BK3 and classify and store a row whose number of errors exceeds a threshold value among the rows of the first to fourth banks BK0 to BK3 as bad areas. Since the error log circuit 280 receives the bank address BA, the row address RA, and the column address CA and the error signal ERR, it is possible to check in which region of which memory bank of the memory core 210 an error is detected. When there is a request for error information from the memory controller 100, that is, when the error information request command ERR_INFO is input, the error information logged in the error log circuit 280, that is, bad area information, may be transferred to the memory controller 100 through the transmitter 234 of the data input/output circuit 230.

The memory core 210 may include the first to fourth banks BK0 to BK3, as shown in FIG. 9. Each of the first to fourth banks BK0 to BK3 may include a cell array including memory cells that are arranged in a plurality of rows and a plurality of columns, a row decoder for activating/deactivating a row of the cell array, a column decoder for inputting/outputting data to/from the cell array, and constituent elements for performing such operations as active, precharge, read, and write operations, such as an input/output circuit.

Each of the first to fourth banks BK0 to BK3 may perform an active operation of activating a row which is selected based on the row address RA when a corresponding bank active signal among the bank active signals ACT_BK<0:3> is activated. Each of the first to fourth banks BK0 to BK3 may perform a precharge operation of deactivating the activated row when a corresponding bank precharge signal among the bank precharge signals BK_PCG<0:3> is activated. Each of the first to fourth banks BK0 to BK3 may perform a target refresh operation of refreshing a row which is selected based on the row address RA when a corresponding bank refresh management signal among the bank refresh management signals BK_RFM<0:3> is activated. Each of the first to fourth banks BK0 to BK3 may perform a write operation of writing the data DATA' and the error correction code ECC into the memory cells of the columns that are selected based on the column address CA in the activated row when a corresponding bank write signal among the bank write signals BK_WT<0:3> is activated. Also, each of the first to fourth banks BK0 to BK3 may perform a read operation of reading the data DATA' and the error correction code ECC from the memory cells of the columns that are selected based on the column address CA in the activated row when a corresponding bank read signal among the bank read signals BK_RD<0:3> is activated.

With the above configuration, the memory device 200 may perform a target refresh operation to refresh adjacent rows of a target row when a row address RA specifying the target row along with the refresh management command RFM is input from the memory controller 100. In addition, when the row address RA specifying the target row is input from the memory controller 100 along with the error check command (e.g., commands including an active command, a read command, a precharge command, and/or a write command), the memory device 200 may read data from the target row or adjacent rows.

Hereinafter, an operation of the memory system 10 according to an embodiment of the present invention will be described with reference to FIGS. 1 to 10.

Figure 10:
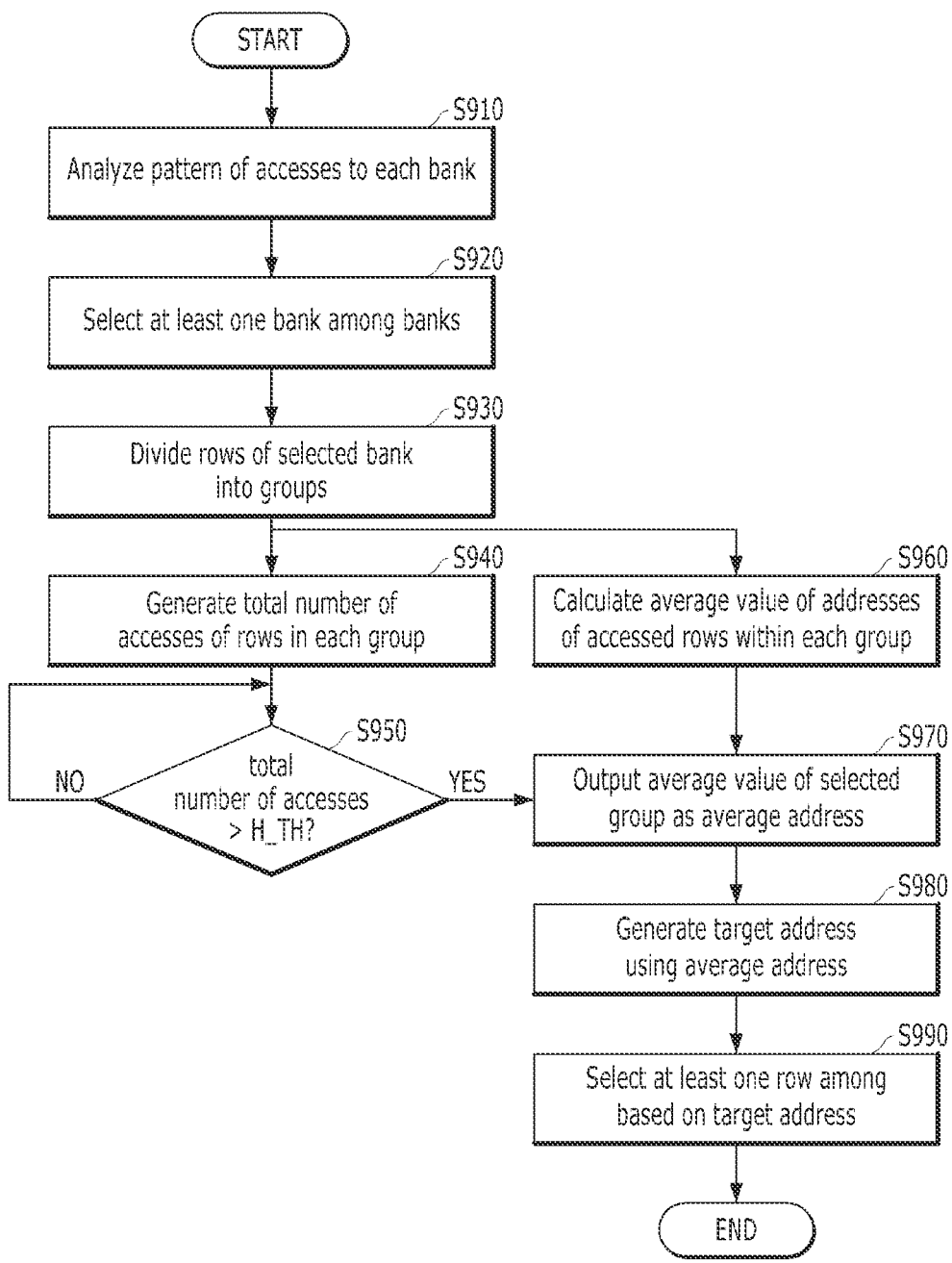
FIG. 10 is a flow chart for describing an operating method of a memory system in accordance with an embodiment of the present invention.

FIG. 10 is a flow chart for describing an operating method of the memory system 10 in accordance with an embodiment of the present invention.

Referring to FIG. 10, the pattern analysis circuit 132 may analyze the pattern of accesses to each bank (at S910), to thereby generate a bank selection signal BA_SEL to select at least one bank among first to fourth banks BK0 to BK4 (at S920). The pattern analysis circuit 132 may compare, for each bank based on a bank address BA, the read/write number with the active number, and if the numbers are similar, that is, if the number is less than the reference number in the difference between the read/write number and the active number, generate a bank selection signal BA_SEL to select a bank vulnerable to a row-hammer attack.

The row detection circuit 134 may divide row of a selected bank that is selected according to the bank selection signal BA_SEL, into a plurality of groups (at S930), and generate a total access number by accumulating and counting the access number of rows for each group (at S940). As described above, operation S930 may be skipped. The row detection circuit 134 may calculate an average value of the addresses indicating the rows, which have been accessed within each group of the selected bank (at S960).

In detail, the histogram analysis circuit 410 may generate a histogram with a value of a row address RA on an X-axis and the input number of the active commands ACT on a Y-axis, and calculate the total access number for each group in the histogram (at S940). When detecting a case where the total access number exceeds a preset threshold value H_TH ("YES" of S950), the histogram analysis circuit 410 may generate a group selection signal G_SEL for specifying a group, of which the total access number is greater than the preset threshold value H_TH. Further, the average row calculation circuit 420 may calculate an average value of the addresses indicating the rows, which have been accessed within each group of the selected bank (at S960), and output the calculated average value of the group that is selected by the group selection signal G_SEL, as an average address AVG_RA (at S970).

Thereafter, the row-hammer management circuit 136 may generate a target address TADD using the average address AVG_RA and provide the target address TADD to the command/address generation module 140 (at S980). The row-hammer management circuit 136 may activate an initialization signal RST after outputting the target address TADD. According to the initialization signal RST, the pattern analysis circuit 132 and the row detection circuit 134 may be initialized.

The command/address generation module 140 may provide the target address TADD together with a refresh management command or an error check command, as a command/address signal C/A.

When a row address RA, i.e., the target address TADD, for designating a target row is input with the refresh management command, the memory device 200 may perform a target refresh operation on adjacent rows of the target row. Further, when a row address RA, i.e., the target address TADD, is input with the error check command (e.g., an active command, a read command, a precharge command, and/or a write command), the memory device 200 may perform an error check operation for reading data from a target row or adjacent rows and checking errors in the read data to select areas with a lot of errors.

As described above, in accordance with the embodiment, the memory system 10 may select a bank with a high possibility of a row-hammer attack by detecting the pattern of accesses in which the read/write number is similar to the active number. In addition, the memory system 10 may select a target row with a high possibility of a row-hammer attack by dividing rows of the selected bank into a plurality of groups and calculating an average value of the addresses indicating the rows, which have been accessed within a group with the access number exceeding a threshold value. Accordingly, the target row may be tracked without counting the number of accesses for each row.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory system, comprising:
 a memory device including banks each including a plurality of rows, and configured to select, within a selected bank of the banks, at least one row from the plurality of rows based on a target address; and
 a row-hammer tracking module configured to:
 select the selected bank based on a pattern of accesses to each of the banks, wherein the pattern is a difference between a read/write number and an active number of each of the banks, and the selected bank has a lesser number than a reference number in the difference, and
 select the target address according to an access number for each of a plurality of groups of the rows within the selected bank.

2. The memory system of claim 1, wherein the row-hammer tracking module selects the target address by:
 calculating, for each of the groups, an average value of addresses specifying the respective rows, which have been accessed, and
 generating the target address based on the average value for a certain group, of which the access number is greater than a threshold value among the groups.

3. The memory system of claim 1, wherein the row-hammer tracking module includes:
 a pattern analysis circuit configured to select the selected bank by comparing, for each of the banks, a read/write number with an active number;
 a row detection circuit configured to:
 calculate, for each of the groups, an average value of addresses specifying the respective rows, which have been accessed, and
 generate an average address according to the average value calculated for a certain group, of which the access number is greater than a threshold value among the groups; and
 a row-hammer management circuit configured to generate the target address according to the average address.

4. The memory system of claim 3,
 wherein the pattern is a difference between a read/write number and an active number of each of the banks, and
 wherein the pattern analysis circuit is configured to select the selected bank has a lesser number than a reference number in the difference.

5. The memory system of claim 3, wherein the row detection circuit includes:
 a histogram analysis circuit configured to generate a group selection signal for specifying the certain group by comparing, for each of the groups, the access number with the threshold value; and
 an average row calculation circuit configured to calculate the average value to generate the average address.

6. The memory system of claim 3, wherein the row-hammer management circuit is further configured to activate an initialization signal for initializing the pattern analysis circuit and the row detection circuit after the target address is output.

7. The memory system of claim 1, further comprising a command/address generation module configured to provide the target address together with a refresh management command or an error check command.

8. The memory system of claim 7, wherein the memory device is further configured to perform a target refresh operation on adjacent rows of the selected row in response to the refresh management command.

9. The memory system of claim 7, wherein the memory device is further configured to perform an error check operation on the selected row or adjacent rows of the selected row in response to the error check command.

10. A memory controller, comprising:
 a pattern analysis circuit configured to select at least one bank among banks based on a pattern of accesses to each of the banks;
 a row detection circuit configured to generate an average address according to an access number of rows in each of groups of rows within the selected bank and an average value of addresses specifying the respective rows, which have been accessed, for each of the groups; and
 a row-hammer management circuit configured to generate a target address based on the average address.

11. The memory controller of claim 10,
 wherein the pattern is a difference between a read/write number and an active number of each of the banks, and
 wherein the selected bank has a lesser number than a reference number in the difference.

12. The memory controller of claim 10, wherein the pattern analysis circuit includes:
 a bank decoder configured to generate, by decoding a bank address, a plurality of bank active signals, a plurality of bank read signals, a plurality of bank write signals, which respectively correspond to the banks;
 a plurality of counting comparison circuits respectively corresponding to the banks, each counting comparison circuit being configured to generate, for a corresponding one of the banks, a difference signal representing a difference between an active number and a read/write number; and a bank selection circuit configured to:

select one of the difference signals, the selected difference signal representing a lesser number than a reference number in the difference, and output, according to the selected difference signal, a bank address representing the selected bank.

13. The memory controller of claim 10, wherein the row detection circuit includes:

a histogram analysis circuit configured to generate a group selection signal for specifying a certain group, of which the access number is greater than a threshold value among the groups, by comparing, for each of the groups, the access number with the threshold value; and an average row calculation circuit configured to calculate, for the certain group, the average value to generate the average address.

14. The memory controller of claim 13, wherein the average row calculation circuit includes:

a plurality of average calculators respectively corresponding to the plurality of groups, each average calculator being configured to calculate the average value of a corresponding one of the groups; and a row selector configured to generate the average address by selecting one of the average values from the plurality of average calculators, the selected average value corresponding to the group selection signal.

15. The memory controller of claim 10, wherein the row-hammer management circuit is further configured to activate an initialization signal for initializing the pattern analysis circuit and the row detection circuit after the target address is output.

16. An operating method of a memory system, the operating method comprising:

selecting at least one bank from banks of a memory device based on a pattern of accesses to each of the banks;

generating an average address according to an access number of rows in each of groups of rows within the selected bank and an average value of addresses specifying the respective rows, which have been accessed, for each of the groups;

generating a target address based on the average address; and selecting at least one row in the memory device from the rows based on the target address.

17. The operating method of claim 16, wherein the pattern is a difference between a read/write number and an active number of each of the banks, and wherein the selected bank has a lesser number than a reference number in the difference.

18. The operating method of claim 16, wherein the generating the average address includes:

calculating the average value of each of the groups;

generating a group selection signal specifying a certain group, of which the access number is greater than a threshold value among the groups; and outputting, as the average address, the average value of the certain group.

19. The operating method of claim 16, further comprising initializing the access number and the average value after the target address is generated.

* * * * *